United States Patent
Kurzion et al.

(10) Patent No.: US 9,183,277 B1
(45) Date of Patent: *Nov. 10, 2015

(54) PROVIDING INTENT SENSITIVE SEARCH RESULTS

(71) Applicant: Google Inc., Mountain View, CA (US)

(72) Inventors: Yair Kurzion, Mountain View, CA (US); Jonathan McPhie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/227,620

(22) Filed: Mar. 27, 2014

Related U.S. Application Data

(63) Continuation of application No. 13/023,488, filed on Feb. 8, 2011, now Pat. No. 8,688,667.

(51) Int. Cl.
   *G06F 17/30* (2006.01)
(52) U.S. Cl.
   CPC ........ *G06F 17/3064* (2013.01); *G06F 17/3053* (2013.01)
(58) Field of Classification Search
   CPC .............. G06F 17/30864; G06F 17/30749; G06F 17/30867; G06F 17/30598; G06F 17/30672; G06F 17/3064; G06F 17/30646
   See application file for complete search history.

(56) References Cited

U.S. PATENT DOCUMENTS

| | | | |
|---|---|---|---|
| 6,581,056 B1 * | 6/2003 | Rao ........................................ 1/1 |
| 7,890,526 B1 | 2/2011 | Brewer et al. |
| 2004/0083211 A1 | 4/2004 | Bradford |
| 2005/0055341 A1 | 3/2005 | Haahr et al. |
| 2005/0198006 A1 | 9/2005 | Boicey et al. |
| 2007/0038615 A1 * | 2/2007 | Vadon .................... G06F 17/273 1/1 |
| 2008/0091670 A1 | 4/2008 | Ismalon |
| 2008/0140643 A1 | 6/2008 | Ismalon |
| 2009/0019026 A1 * | 1/2009 | Valdes-Perez et al. ........... 707/5 |
| 2009/0287681 A1 | 11/2009 | Paek et al. |
| 2010/0121847 A1 * | 5/2010 | Olston .......................... 707/736 |
| 2011/0087686 A1 | 4/2011 | Brewer et al. |
| 2012/0323953 A1 * | 12/2012 | Ortega .............. G06F 17/30997 707/767 |

* cited by examiner

*Primary Examiner* — Angelica Ruiz
(74) *Attorney, Agent, or Firm* — Fish & Richardson P.C.

(57) ABSTRACT

Methods, systems, and apparatus, including computer programs encoded on a computer storage medium, for providing intent sensitive search results. In one aspect, a method includes receiving a current query for a current search session that is associated with a user identifier. One or more potential refinements for the current query are identified, each potential refinement being one or more terms and based on previous queries associated with the user identifier and previous queries associated with other user identifiers. One or more secondary queries are generated, each secondary query including the current query and one of the potential refinements, each secondary query matching a query-refinement pair in a trigger map that includes a plurality of query-refinement pairs. Secondary search results are identified for the secondary queries. Search results are provided including at least one of the secondary search results.

20 Claims, 4 Drawing Sheets

PROVIDING INTENT SENSITIVE SEARCH RESULTS

CROSS-REFERENCE TO RELATED APPLICATIONS

This application is a continuation of U.S. patent application Ser. No. 13/023,488, entitled "PROVIDING INTENT SENSITIVE SEARCH RESULTS," filed Feb. 8, 2011, which is incorporated herein by reference in its entirety.

BACKGROUND

This specification relates to providing search results, and in particular to providing search results based on information indicative of a user's search intent.

Internet search engines provide information about Internet accessible resources (e.g., web pages, images, text documents, and multimedia content) that are responsive to users' queries by returning search results in response to the queries. A search result includes, for example, a Uniform Resource Locator (URL) and a snippet of information for a resource responsive to a query. The search results can be ranked according to scores assigned to the search results by a scoring function. The scoring function generates the scores for the search results according to various signals, for example, where (and how often) query terms appear in the search results and how common the query terms are in the search results indexed by the search engine.

Often users provide queries that cause a search engine to return results that are not of interest to the users, or do not fully satisfy the users' need for information. Search engines may provide such results for a number of reasons, such as the queries being a poor expression of the information needed. It is thus common for users to refine queries multiple times during search sessions.

SUMMARY

A search system provides intent sensitive search results in response to a query from a user. The search system determines potential user intents, e.g., by analyzing the user's search history. The search system uses a trigger map to create one or more secondary queries including the query and potential user intents. The trigger map includes query-refinement pairs. The search system provides search results for the query and the secondary queries. Consider an example search session where a user submits the queries "pirate costume" and "ninja," in that order. The search system can determine that "costume" is a potential user intent and provide search results for "ninja" along with "ninja costume."

In general, one innovative aspect of the subject matter described in this specification can be embodied in methods that include the actions of receiving, by a data processing apparatus, a current query for a current search session that is associated with a user identifier, the current query including one or more terms; identifying, by the data processing apparatus, one or more potential refinements for the current query, each potential refinement being one or more terms and based on previous queries associated with the user identifier and previous queries associated with other user identifiers, each previous query being a query that was received prior to the current query; generating, by the data processing apparatus, one or more secondary queries, each secondary query including the current query and one of the potential refinements, each secondary query matching a query-refinement pair in a trigger map that includes a plurality of query-refinement pairs, each query-refinement pair being a refinement of one or more terms paired to a query of one or more terms; identifying, by the data processing apparatus, secondary search results for the secondary queries; and providing, by the data processing apparatus and in response to receiving the current query, search results including at least one of the secondary search results. Other embodiments of this aspect include corresponding systems, apparatus, and computer programs, configured to perform the actions of the methods, encoded on computer storage devices.

These and other embodiments can each optionally include one or more of the following features. Identifying one or more potential refinements for the current query comprises, for each potential refinement: determining that the terms of a previous query match the terms of a query-refinement pair in the trigger map; and selecting the refinement of the query-refinement pair as the potential refinement.

The previous queries include queries for the current search session and a previous search session associated with the user identifier, the previous search session being a search session previous to the current search session. The actions further include: accessing a query log storing queries that were submitted for search sessions; identifying a first query that is subsequent to a second query in a search session and that includes one or more terms and the second query; storing the one or more terms of the first query and the second query and as a query-refinement pair in the trigger map, wherein the one or more terms of the first query is the refinement of the query-refinement pair and the second query is the query of the query-refinement pair. Generating the secondary queries comprises: generating a first candidate secondary query by combining the current query with a potential refinement; and determining that the first candidate secondary query matches a query-refinement pair in the trigger map and, in response to the determination, identifying the first candidate secondary query as a secondary query. Generating the secondary queries further comprises: assigning scores for each of the secondary queries and removing secondary queries having scores not meeting a criteria from consideration, wherein assigning a score for a secondary query comprises accessing a query log and finding the secondary query in the query log. Providing search results including at least one of the secondary search results comprises: identifying scores for each current search result, the scores being used to rank the search results in a descending order, with the search result having the highest score being ranked first in the order; selecting two current search results that are consecutive in the order and that have respective scores that exceed a threshold difference; and inserting at least one of the secondary search results between the two consecutive search results in the order.

In general, another innovative aspect of the subject matter described in this specification can be embodied in methods that includes the actions of receiving, by a data processing apparatus, a current query for a current search session that is associated with a user identifier, the current query including one or more terms; accessing, by the data processing apparatus, previous queries from the current search session associated with the user identifier, the previous queries provided prior to the current query during the current search session; accessing, by the data processing apparatus, a trigger map comprising query-refinement pairs, each query-refinement pair being a refinement of one or more terms paired to a query of one or more terms, and wherein the refinement is used to modify the query; identifying, by the data processing apparatus, potential refinements for the current query from the previous queries and the trigger map, each potential refinement having been included in at least one of the previous queries; generating, by the data processing apparatus, secondary queries, each secondary query including the current query and one of the intent refinements and matching a query-refinement pair in the trigger map; identifying, by the data processing apparatus, current search results for the current query and secondary search results for the secondary queries; and providing, by the data processing apparatus and in response to receiving the current query, search results including at least one of the current search results and at least one of the secondary search results. Other embodiments of this aspect include corresponding systems, apparatus, and computer programs, configured to perform the actions of the methods, encoded on computer storage devices.

These and other embodiments can each optionally include one or more of the following features. Identifying one or more potential refinements for the current query comprises, for each potential refinement: determining that the terms of a previous query match the terms of a query-refinement pair in the trigger map; and selecting the refinement of the query-refinement pair as the potential refinement. Generating secondary queries comprises, for each potential refinement: generating a secondary query that includes the current query and the potential refinement only if the terms of the current query and the potential refinement match the terms of a query-refinement pair in the trigger map. The previous queries only include queries for the current search session. The previous queries include queries for the current search session and a previous search session associated with the user identifier, the previous search session being a search session previous to the current search session. The actions further include: accessing a query log storing queries that were submitted for search sessions; identifying a first query that is subsequent to a second query in a search session and that includes one or more terms and the second query; storing the first query and the second query and a query-refinement pair in the trigger map, wherein the first query is the refinement of the query-refinement pair and the second query is the query of the query-refinement pair. Providing search results including at least one of the current search results and at least one of the secondary search results comprises: identifying scores for each current search result, the scores being used to rank the search results in a descending order, with the search result having the highest score being ranked first in the order; selecting two current search results that are consecutive in the order and that have respective scores that exceed a threshold difference; and inserting at least one of the secondary search results between the two consecutive search results in the order.

Particular embodiments of the subject matter described in this specification can be implemented so as to realize one or more of the following advantages. A search system can provide results using indications of a user's search intent. The user's informational needs can thus be satisfied more quickly than if the user had manually provided multiple query revisions, as the search system reduces the number of times a user needs to enter an additional, refined query. Mobile users can find results with less typing, thus saving them time. The search system can improve its user experience, e.g., by promoting the feeling of a "conversation" with the search system, like talking to a concierge who remembers what you asked a few minutes ago, or even a few days ago.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
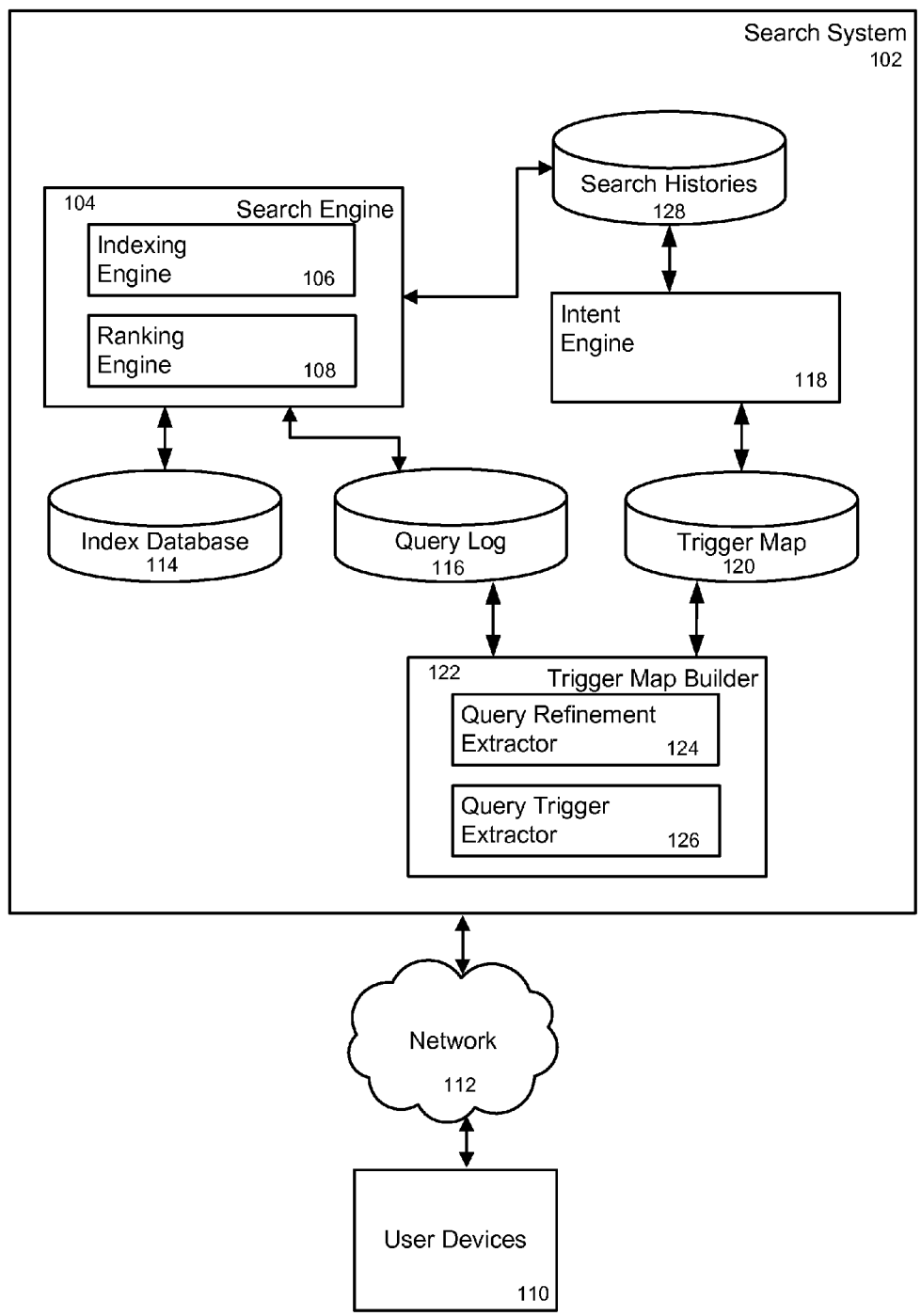
FIG. 1 is a block diagram of a search system that provides intent sensitive search results.

FIG. 1 is a block diagram of a search system 102 that provides intent sensitive search results. The search system 102 is implemented on one or more computers. The search system 102 communicates with user devices 110 over a data communication network 112, such as the Internet. A user can send search queries to the search system 102 using a user device 110, e.g., a personal computer or smart phone running a web browser. The search system 102 responds to the query by sending search results to the user device 110, e.g., for presentation in a web browser.

The search system 102 includes a search engine 104. The search engine 104 identifies resources relevant to queries. The search engine 104 includes an indexing engine 106 that crawls publisher servers and indexes resources provided by the publisher servers. The index information is stored in an index database 114. In general, the index database 114 may include various types of indexes for resources, including keyword-based indexes, location-based indexes, and other indexes. The search engine 104 also includes a ranking engine 108 that ranks resources, e.g., by quality, by relevancy to a query, or both.

The search system 102 stores information on received search queries in a query log 116. The query log 116 includes, for example, received queries from various user devices over a period of time and for each query, a timestamp and source information. The source information may be, for example, a user identifier, an Internet Protocol (IP) address, or the like. Typically, the query log 116 includes the source information includes an identifier that is unique to a particular user device but not to any particular user. In some implementations, for privacy, IP addresses associated with queries are removed and replaced with other identifiers. In some implementations, information in the query log 116 is aggregated, so that for any query, the only information stored is how many times the query has been submitted by any user.

The search system stores search sessions for a particular user identifier in a search histories database 128. In general, a session is a period during which a user submits queries and is associated with a user identifier. A session can be measured in a number of ways including, for example, by a specified period of time (for example, thirty minutes), by a specified number of queries (for example, fifteen queries), until a specified period of inactivity (for example, ten minutes without submitting a query), while a user is logged-in to a system, or while a user submits queries that relate to similar topics.

An intent engine 118 identifies intent sensitive search results for the search system 102 to provide to users. When the search system 102 receives a query from a user, the intent engine 118 identifies potential refinements for the user, e.g., by comparing the received query and previous queries associated with the user to a trigger map 120. The previous queries are stored in the search histories database 128. The trigger map 120 stores query-refinement pairs. Each query-refinement pair is a refinement of one or more terms paired to a query of one or more terms, and each refinement was used to modify the query with which it is paired. The trigger map 120 is described in more detail below.

The intent engine 118 then generates secondary queries using the received query, the potential refinements, and the trigger map 120 that includes the query-refinement pairs. The intent engine 118 provides the secondary queries to the search system 102, and the search system 102 provides search results, identified by the search engine 104, for both the received query and for one or more of the secondary queries. Providing the search results is described further below with respect to FIG. 4.

A trigger map builder 122 builds the trigger map 120 using the query log 116. A query refinement extractor 124 analyzes the query log 116 for intent refinements, e.g., terms added by users to original queries to refine them. A query trigger extractor 126 analyzes the query log 116 for queries that users refined using the intent refinements extracted by the query refinement extractor 124. The trigger map builder 122 pairs the extracted query triggers with the extracted intent refinements used to refine those query triggers to create query-refinement pairs in the trigger map 120. Building the trigger map is described further below with respect to FIG. 2.

Figure 2:
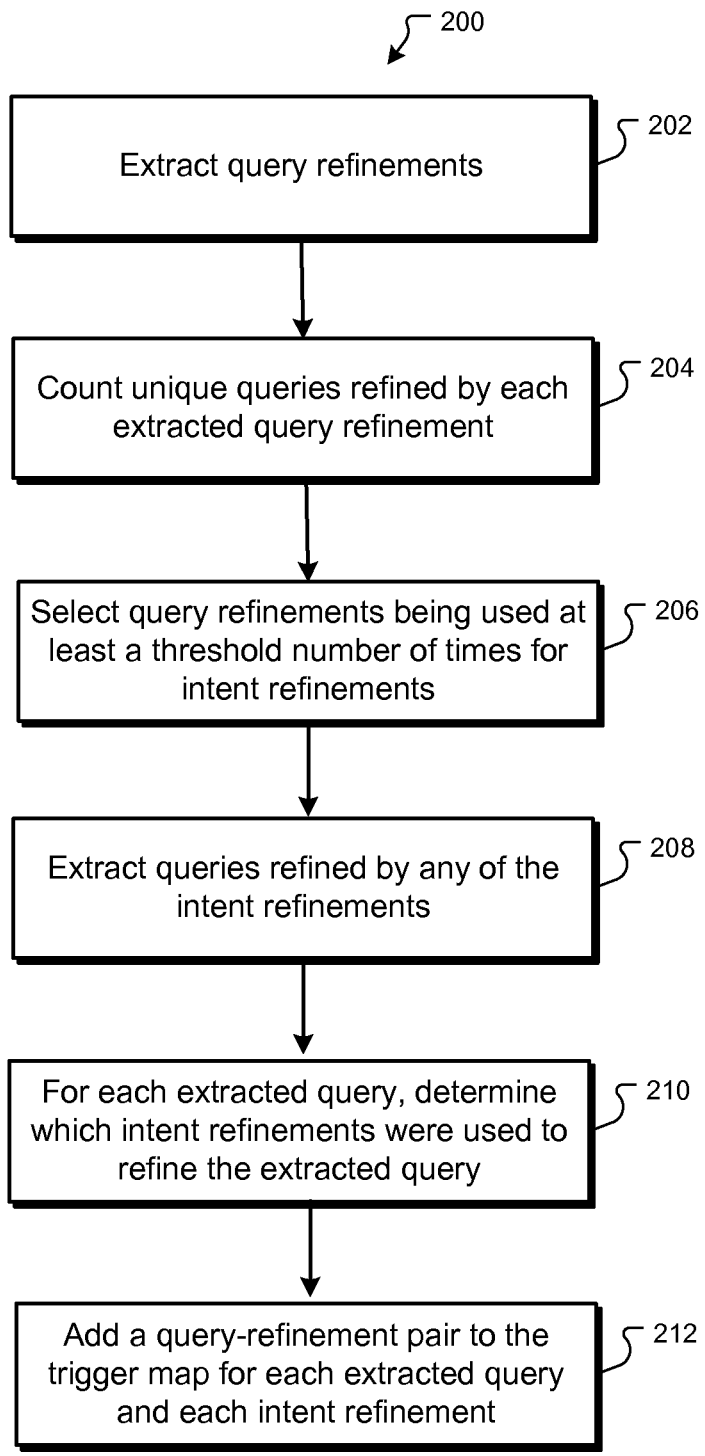
FIG. 2 is a flow diagram of an example process for building a trigger map.

FIG. 2 is a flow diagram of an example process 200 for building a trigger map, e.g., the trigger map 120 of FIG. 1. In some implementations, a system of one or more computers performs the process 200. For example, the trigger map builder 122 of FIG. 1 may perform the process 200. For convenience, the process 200 will be described with respect to a system that performs the process 200.

The system extracts query refinements from a query log (e.g., the query log 116 of FIG. 1) (step 202). A query refinement is one or more terms that a user added to first query to form a second, subsequent query, apparently to refine to the first query. For example, a user may submit an initial query "pirate" and then submit a subsequent query "pirate costume." The system extracts "costume" as a query refinement because it was added to the original query "pirate" in a subsequent query that included the original query. The system identifies a query refinement using search sessions, e.g., by identifying a first query that is subsequent to a second query in a search session and that includes one or more terms and the second query.

The subsequent query need not be next in sequence; for example, during a session, the user may enter the sequence of queries "pirate," "sailor" and "pirate costume." The system still extracts "costume" as a query refinement because it was added to the original query "pirate" in a subsequent query that included the original query.

In some implementations, the system extracts a query refinement only when the subsequent query is submitted within a threshold amount of time from the original query. In some implementations, the system extracts query refinements when the subsequent query does not include the original query but instead includes variations of the original query, e.g., spelling variations of the original query, n-grams of the original query, or canonical forms of the original query.

A refinement may be related to any of various topics. For example, a refinement may imply a geographic intent, e.g., where the query "bus schedule" is followed by the query "bus schedule San Francisco." A refinement may imply an age preference, e.g., where the refinement "for kids" is added in a subsequent query. A refinement may imply a style or content preference, e.g., where a refinement such as "pictures," "reviews," or "best price" is added in a subsequent query. A refinement may imply a topic disambiguation, e.g., where the query "jaguar" is followed by the query "jaguar operating system."

For each query refinement, the system counts the number of unique original queries that users refined by adding the query refinement in a subsequent query (step 204). The system selects query refinements having more than a threshold number of unique queries as intent refinements (step 206). By selecting query refinements having more than a threshold number of unique queries, the system selects intent refinements that are likely to have broad interest to users, while avoiding or reducing the likelihoods of topic drift.

The system extracts queries from the query log that were refined by any of the intent refinements (step 208). The extracted queries are the kind of queries that users may want to refine. Thus, they extracted queries can be considered "trigger" queries for triggering intent sensitive search results, e.g., as described below with respect to FIG. 4.

For each extracted query, the system determines which of the intent refinements were used to refine the extracted query (step 210). The system adds a query-refinement pair to the trigger map for each extracted query and each intent refinement used to refine the extracted query (step 212).

Figure 3:
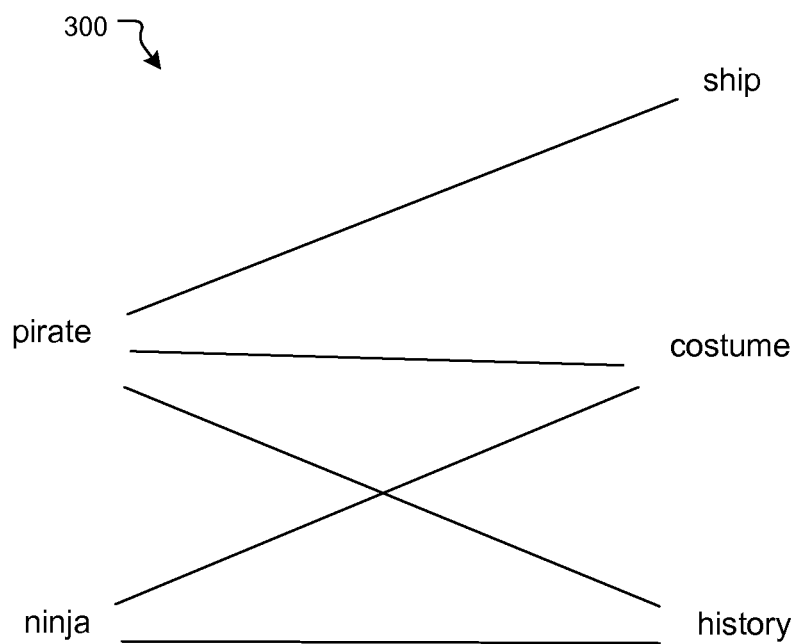
FIG. 3 is a conceptual illustration of a trigger map.

FIG. 3 is a conceptual illustration of a trigger map 300, e.g., the trigger map 120 of FIG. 1. In a computer system, the trigger map 300 may be stored using any of various data structures.

The terms on the right hand side of the trigger map 300 are intent refinements. A search system may provide intent sensitive search results by finding intent refinements in past user search histories and using the intent refinements in responding to current queries. The trigger map 300 may be populated with intent refinements from various sources. For example, the intent refinements may be the intent refinements determined in step 206 of the process 200 described in FIG. 2. In another example, the intent refinements may be selected HI by a search system administrator, or provided by a third party.

The terms on the left hand side of the trigger map 300 are queries that were modified by the intent refinements. Each query that is connected to a intent refinement is a query-refinement pair in the trigger map 300. The terms on the left hand side of the trigger map may also be from other sources. For example, the terms may be selected by a search system administrator, or retrieved from disambiguation pages on the web. In another example, query-refinement pairs may be queries frequently submitted from users associated with a same location, where the refinement is a name of the location. Suppose many users in San Francisco (as determined, e.g., by IP addresses) submit the query "foo." The trigger map may include a query-refinement pair having the query "foo" and the refinement "San Francisco." In another example, query-refinement pairs may have public entities (e.g., zoos, schools, banks, and so on) as queries and locations of the public entities as refinements. Public entities and their locations may be determined from various sources, e.g., a web site provided by a city's chamber of commerce. Suppose a city's chamber of commerce provides a web site that references a zoo. The trigger map may include a query-refinement pair having the query "zoo" and the refinement "city."

To provide intent sensitive search results in response to receiving a query, a search system may find intent refinements in the user's search history and determine whether any of those intent refinements match the received query in the trigger map 300. The search system may use those intent refinements in providing search results, e.g., by searching for queries that include both the received query and the intent refinements and providing search results from those searches.

Figure 4:
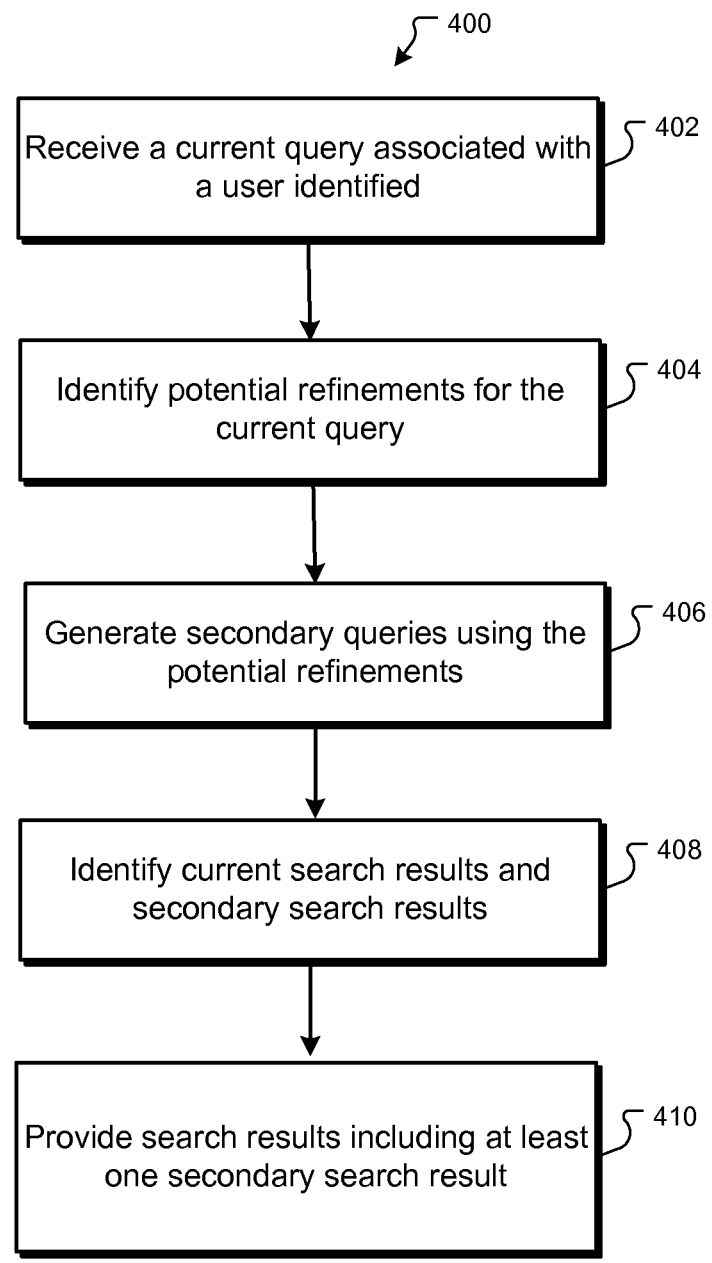
FIG. 4 is a flow diagram of an example process for providing intent sensitive search results.

FIG. 4 is a flow diagram of an example process 400 for providing intent sensitive search results. In some implementations, a system of one or more computers performs the process 400. For example, the search system 102 of FIG. 1 may perform the process 400 using the intent engine 118 of FIG. 1. For convenience, the process 400 will be described with respect to a system that performs the process 400.

The system receives a current query for a current search session that is associated with a user identifier (step 402). The user identifier may be a username (e.g., where the user has logged in to the system or a related system), an IP address, a random session number associated with a cookie, etc. The current query includes one or more terms.

The system identifies one or more potential refinements for the current query (step 404). Each potential refinement is one or more terms. Each potential refinement is based on information collected about the user. For example, each potential refinement may be based on previous queries associated with the user identifier and previous queries associated with other user identifiers, each previous query being a query that was received prior to the current query. Previous queries associated with other user identifiers may be stored in a trigger map (e.g., the trigger map 120 of FIG. 1).

Previous queries associated with the user identifier may include queries for the current search session and a previous search session associated with the user identifier, the previous search session being a search session previous to the current search session. Previous queries associated with the user identifier may be stored in a search history for the user identifier. The search history may be a recent search history, e.g., within a matter of a minutes, or within a search session of a number of queries clustered closely in time. The search history may be a long term search history, e.g., all queries received by the user for the last month or year. The search history may be identified from various sources. For example, the search history may be included in a search histories database (e.g., the search histories database 128 of FIG. 1). In another example, a search history is stored on a user device (e.g., the user device 110 of FIG. 1), and the system requests the search history from the user device.

To identify potential refinements based on previous queries associated with the user identifier and previous queries associated with other user identifiers, the system determines, for each potential refinement, that the terms of a previous query match the terms of a query-refinement pair in the trigger map, and then selects the refinement of the query-refinement pair in the trigger map as the potential refinement.

In some implementations, identifying the potential refinements includes receiving an indication of an intent from the user. For example, the search system may present an intent user interface element to the user along with the search user interface element that accepts user queries. The intent user interface element may include, for example, a field that accepts text, or a drop down menu populated with intent refinements.

In some implementations, identifying the potential refinements includes analyzing query refinements associated with other user identifiers related to the user identifier associated with the current query. For example, the user identifier of the current query may be associated with certain interests, e.g., by information stored in a user profile or by a search history, or by a browsing history including frequently visited web sites. The system may analyze query refinements made by other user identifiers associated with the same interests for potential refinements for the current query. In another example, the user identifier may be related to other user identifiers on a social network, e.g., as chat buddies, friends, followers, or the like.

In some implementations, identifying potential refinements includes analyzing search histories for common query fragments that are not refinements. The system may analyze a search history for the user identifier of the current query or search histories for other user identifiers related to the user identifier. For example, suppose that the user identifier is related by a social network with other user identifiers having search histories that include queries with the fragment "San Francisco," e.g., "zoo San Francisco" and "groceries in San Francisco." Even though "San Francisco" was not necessarily used to refine any particular queries, the system may identify the fragment "San Francisco" as a potential refinement.

The system generates one or more secondary queries (step 406). Each secondary query includes the current query and one of the potential refinements. Each secondary query matches a query-refinement pair in a trigger map. For example, the system may combine the current query with each of the potential refinements identified in step 404, or a fixed number of potential intent refinements. In some implementations, the system assigns a score to each of the secondary queries and keeps only secondary queries meeting a criteria, e.g., keeps only a certain number of secondary queries or keeps only secondary queries having a score that exceeds a threshold. The score may be based on, e.g., how frequently a secondary query is searched for, which the system determines using, e.g., a query log. An example score for a secondary query is a capped count of the query multiplied by a weight reflecting the amount of time since the secondary queries were submitted. That example score takes into account changing search patterns, e.g., where "costume" is search for more frequently before Halloween.

To illustrate the use of the scores, consider a search session where a user submits the queries "ninja costume," "ninja history," and "pirate" in that order. The system determines that "costume" and "history" are potential refinements. The system assigns scores to "ninja costume" and "ninja history," (the queries including the potential refinements), and "pirate costume" and "pirate history" (the secondary queries). If "ninja costume" and "pirate costume" are high scoring queries, the system may choose to use "pirate costume" over "pirate history" or to order search results for "pirate costume" above results for "pirate history." Various scoring techniques using scores for the queries including the potential refinements and secondary queries are possible. For example, the system may adjust scores of queries based on the order of queries in a search session so that more recent queries have higher scores. This is useful, for example, because the most recent query is more likely to be relevant to the current query intent than the second most recent query.

The system identifies secondary search results for the secondary queries (step 408). The system can also identify current search results for the current query. The system may send the queries to a search engine, e.g., the search engine 104 of FIG. 1.

The system provides intent sensitive search results (step 410). The intent sensitive search results include at least one of the secondary search results for the secondary queries, and the intent sensitive search results may include current search results. The system may use various techniques to merge and order the current search results and the secondary search results.

For example, consider a merging technique where the system assigns scores to the search results, e.g., quality scores or scores reflecting relevance to the current query. The quality scores may be received from a search engine, e.g., the search engine 104 of FIG. 1, and used to rank the search results in a descending order. Starting with the current search result having the highest score, the system selects search results from the current search results until the difference between the score of the selected search result and the score of the previously selected search result exceeds a threshold difference. The system then provides current search results in the order selected and secondary search results after the current search results. For instance, the system may select two current search results that are consecutive in the order and that have respective scores that exceed a threshold difference and inserting at least one of the secondary search results between the two consecutive search results in the order.

In another example where the system assigns scores to the search results, the system may use a basic score threshold to determine where to insert secondary search results. The system orders the current search results in descending order of their scores, and then inserts one or more secondary search results before any current search results having scores below a threshold score.

The system may provide the secondary search results mixed in with the current search results or separately. For example, the system may put the current search results in one column and the secondary search results in another column, or the system may offer the user a link to the secondary search results. The system may mark the secondary search results, e.g., with a "predicted" label or a stylistic change.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving, by the one or more computers, a current query for a current search session that is associated with a user identifier, the current query including one or more terms;
   identifying, by the one or more computers, one or more potential refinements for the current query, each potential refinement being one or more terms and based on a query that was received prior to the current query;
   generating, by the one or more computers, one or more secondary queries, each secondary query including the current query and one of the potential refinements, each secondary query matching a query-refinement pair being a refinement of one or more terms paired to a query of one or more terms;
   identifying, by the one or more computers, a plurality of current search results for the current query and a plurality of secondary search results for the secondary queries; and
   providing, by the one or more computers and in response to receiving the current query, a search results resource to a client device associated with the user identifier and the current search session, the search results resource including at least one of the secondary search results and at least one of the current search results.

2. The method of claim 1, wherein identifying one or more potential refinements for the current query comprises, for each potential refinement:
   determining that the terms of a previous query match the terms of a query-refinement pair in the trigger map; and
   selecting the refinement of the query-refinement pair as the potential refinement.

3. The method of claim 2, wherein the previous queries include queries for the current search session and a previous search session associated with the user identifier, the previous search session being a search session previous to the current search session.

4. The method of claim 1, further comprising:
   accessing a query log storing queries that were submitted for search sessions;
   identifying, in the query log, a first query that is subsequent to a second query in a search session and that includes one or more terms and the second query;
   storing the one or more terms of the first query and the second query as a query-refinement pair in the trigger map, wherein the one or more terms of the first query is the refinement of the query-refinement pair and the second query is the query of the query-refinement pair.

5. The method of claim 1, wherein generating the secondary queries comprises:
   generating a first candidate secondary query by combining the current query with a potential refinement; and
   determining that the first candidate secondary query matches a query-refinement pair in the trigger map and, in response to the determination, identifying the first candidate secondary query as a secondary query.

6. The method of claim 1, wherein generating the secondary queries further comprises:
assigning scores for each of the secondary queries and removing secondary queries having scores not meeting a criteria from consideration, wherein assigning a score for a secondary query comprises accessing a query log and finding the secondary query in the query log.

7. The method of claim 1, wherein providing search results including at least one of the secondary search results comprises:
identifying scores for each current search result, the scores being used to rank the search results in a descending order, with the search result having the highest score being ranked first in the order;
selecting two current search results that are consecutive in the order and that have respective scores that exceed a threshold difference; and
inserting at least one of the secondary search results between the two consecutive search results in the order.

8. A system comprising one or more computers, including one or more processors and a memory, configured to perform operations comprising:
receiving, by the one or more computers, a current query for a current search session that is associated with a user identifier, the current query including one or more terms;
identifying, by the one or more computers, one or more potential refinements for the current query, each potential refinement being one or more terms and based on a query that was received prior to the current query;
generating, by the one or more computers, one or more secondary queries, each secondary query including the current query and one of the potential refinements, each secondary query matching a query-refinement pair being a refinement of one or more terms paired to a query of one or more terms;
identifying, by the one or more computers, a plurality of current search results for the current query and a plurality of secondary search results for the secondary queries; and
providing, by the one or more computers and in response to receiving the current query, a search results resource to a client device associated with the user identifier and the current search session, the search results resource including at least one of the secondary search results and at least one of the current search results.

9. The system of claim 8, wherein identifying one or more potential refinements for the current query comprises, for each potential refinement:
determining that the terms of a previous query match the terms of a query-refinement pair in the trigger map; and
selecting the refinement of the query-refinement pair as the potential refinement.

10. The system of claim 9, wherein the previous queries include queries for the current search session and a previous search session associated with the user identifier, the previous search session being a search session previous to the current search session.

11. The system of claim 8, the operations further comprising:
accessing a query log storing queries that were submitted for search sessions;
identifying, in the query log, a first query that is subsequent to a second query in a search session and that includes one or more terms and the second query;
storing the one or more terms of the first query and the second query as a query-refinement pair in the trigger map, wherein the one or more terms of the first query is the refinement of the query-refinement pair and the second query is the query of the query-refinement pair.

12. The system of claim 8, wherein generating the secondary queries comprises:
generating a first candidate secondary query by combining the current query with a potential refinement; and
determining that the first candidate secondary query matches a query-refinement pair in the trigger map and, in response to the determination, identifying the first candidate secondary query as a secondary query.

13. The system of claim 8, wherein generating the secondary queries further comprises:
assigning scores for each of the secondary queries and removing secondary queries having scores not meeting a criteria from consideration, wherein assigning a score for a secondary query comprises accessing a query log and finding the secondary query in the query log.

14. The system of claim 8, wherein providing search results including at least one of the secondary search results comprises:
identifying scores for each current search result, the scores being used to rank the search results in a descending order, with the search result having the highest score being ranked first in the order;
selecting two current search results that are consecutive in the order and that have respective scores that exceed a threshold difference; and
inserting at least one of the secondary search results between the two consecutive search results in the order.

15. A non-transitory computer storage medium encoded with a computer program, the program comprising instructions that when executed by one or more computers cause the one or more computers to perform operations comprising:
receiving, by the one or more computers, a current query for a current search session that is associated with a user identifier, the current query including one or more terms;
identifying, by the one or more computers, one or more potential refinements for the current query, each potential refinement being one or more terms and based on a query that was received prior to the current query;
generating, by the one or more computers, one or more secondary queries, each secondary query including the current query and one of the potential refinements, each secondary query matching a query-refinement pair being a refinement of one or more terms paired to a query of one or more terms;
identifying, by the one or more computers, a plurality of current search results for the current query and a plurality of secondary search results for the secondary queries; and
providing, by the one or more computers and in response to receiving the current query, a search results resource to a client device associated with the user identifier and the current search session, the search results resource including at least one of the secondary search results and at least one of the current search results.

16. The computer storage medium of claim 15, wherein identifying one or more potential refinements for the current query comprises, for each potential refinement:
determining that the terms of a previous query match the terms of a query-refinement pair in the trigger map; and
selecting the refinement of the query-refinement pair as the potential refinement.

17. The computer storage medium of claim 16, wherein the previous queries include queries for the current search session and a previous search session associated with the user identifier, the previous search session being a search session previous to the current search session.

18. The computer storage medium of claim 15, the operations further comprising:
   accessing a query log storing queries that were submitted for search sessions;
   identifying, in the query log, a first query that is subsequent to a second query in a search session and that includes one or more terms and the second query;
   storing the one or more terms of the first query and the second query as a query-refinement pair in the trigger map, wherein the one or more terms of the first query is the refinement of the query-refinement pair and the second query is the query of the query-refinement pair.

19. The computer storage medium of claim 15, wherein generating the secondary queries comprises:
   generating a first candidate secondary query by combining the current query with a potential refinement; and
   determining that the first candidate secondary query matches a query-refinement pair in the trigger map and, in response to the determination, identifying the first candidate secondary query as a secondary query.

20. The computer storage medium of claim 15, wherein generating the secondary queries further comprises:
   assigning scores for each of the secondary queries and removing secondary queries having scores not meeting a criteria from consideration, wherein assigning a score for a secondary query comprises accessing a query log and finding the secondary query in the query log.

* * * * *